Figure 1:
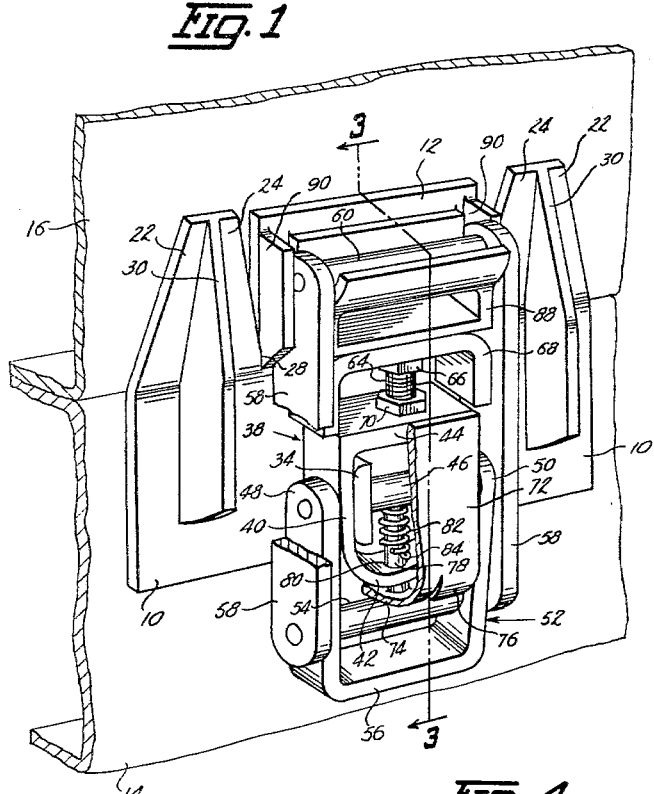

Dec. 22, 1964     T. W. BLASINGAME     3,162,419
FASTENING DEVICE

Filed March 15, 1962     2 Sheets-Sheet 1

INVENTOR.
THOMAS W. BLASINGAME

BY Morton I. Adler
ATTORNEY.

Dec. 22, 1964         T. W. BLASINGAME         3,162,419
                       FASTENING DEVICE
Filed March 15, 1962                      2 Sheets-Sheet 2
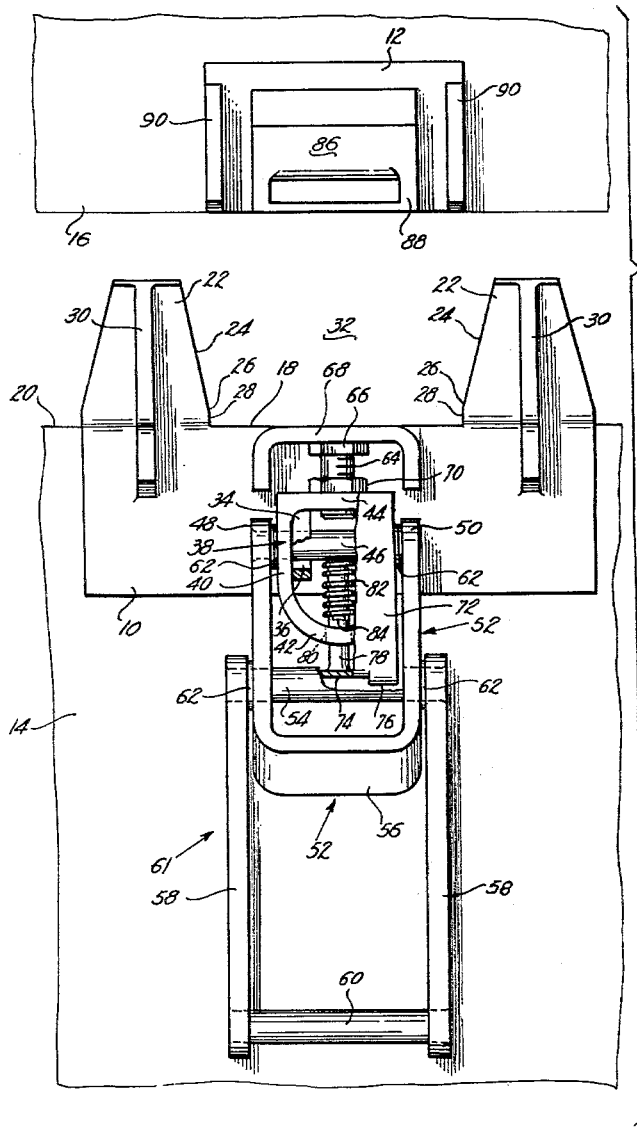
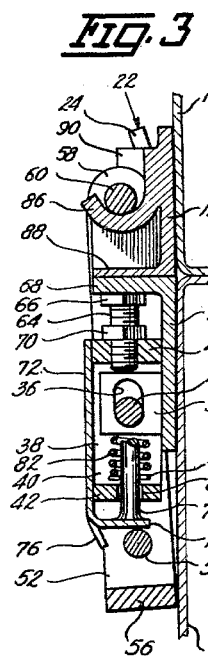
INVENTOR.
THOMAS W. BLASINGAME
BY Morton S. Adler
ATTORNEY.

United States Patent Office 3,162,419
Patented Dec. 22, 1964

3,162,419
FASTENING DEVICE
Thomas W. Blasingame, P.O. Box 1327,
Rapid City, S. Dak.
Filed Mar. 15, 1962, Ser. No. 179,977
15 Claims. (Cl. 248—361)

This invention relates to fastening devices and more particularly to such devices using complementary components employed in removably securing together two entirely separate units of generally bulky and heavy construction such as an engine to a base, one bin upon another, a truck body to a truck chassis and units of comparable character.

In the fastening or locking device to be described, I have included the well known feature of a pivotally attached link movable over center similar to over-center loops, links and hasps commonly in use on trunks, suitcases, boxes and the like and have added certain material improvements for enhancing the efficient operation of my device in the environment in which it is used. In the trunk or suitcase type over-center hasps, it should be pointed out that the portions of the trunk or suitcase to be secured are hinged together at one side, such portions usually being a bottom and top or lid. Because of such hinge connection, such bottom and top are self seeking as to proper alignment both laterally and longitudinally and there is little, if any, problem involved in parts to be secured arriving at a position where the related portions of the hasp do not properly register. Fasteners for trunks and like objects are usually of light materials sufficient only to hold hinged members together and intrinsic strength in such fasteners is not required.

Since my invention contemplates a fastening device for completely detached and separate units of great weight and bulk as indicated above, one of the important features resides in the provision of means to align complementary components when they are introduced to each other.

Another important object is to construct this fastening device so as to include means for temporarily supporting substantial weights that may be imposed upon it in the placing of one heavy object upon another while maneuvering the same into fastening position.

A further feature of this invention lies in the provision of an adjustable link or hasp whereby the efficient locking of this device can be accommodated to a variation in distance between the complementary components thereof due to the use at times of a cushioning strip between members to be locked or to other slight variations in bed plates and the like on generally similar equipment. In this respect an important feature resides in the fact that such adjustments may be made while this device is in locked position.

Still another object is to provide a secondary locking means, requiring deliberate manipulation, to assure against accident release of this fastening device and so arranged that it is adequately shielded from dirt, grime and other foreign matter.

Figure 4:
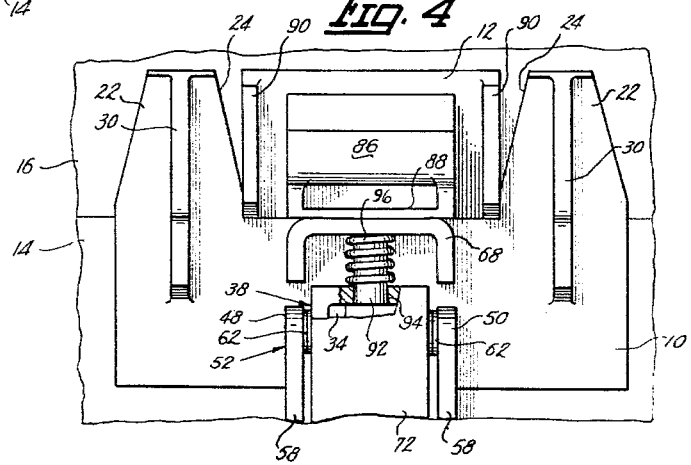

Other objects and advantages of this invention reside in the details of construction and correlation of the various parts and will be apparent as the description proceeds. This invention consists of novel parts and combination of parts to be hereinafter described whereby the objects set forth are attained, as pointed out in the claims, and illustrated in the accompanying drawings, in which:

FIG. 1 is a perspective view of this fastening device illustrating its locked position relative to two members to be secured together, FIG. 2 is an exploded front view showing the complementary component parts of this invention, FIG. 3 is a longitudinal sectional view taken on the line 3—3 of FIG. 1, and FIG. 4 is a fragmentary front view illustrating a modified structure for adjustability of the link.

Referring to the drawings this fastening device includes an elongated base plate 10 and a receiver plate 12 which are respectively designed to be secured in any suitable manner such as welding or the like to the respective members 14 and 16 that are to be releasably fastened together. In this respect it will be understood that member 14 may represent a truck chassis, motor support, the upper portion of a bin or any other object upon which another object is to be placed for attachment, and such other object or member 16 may include the motor, lower portion of a bin, panel or the like to be arranged in the relative position to member 14 shown in the drawings.

The top edge 18 of the base plate 10 (FIG. 2) is flush with the top edge 20 of member 14 and at each end portion of plate 10 on the top edge 18 I provide the upwardly extending extensions or guides 22 which are inclined or flared outwardly relative to the vertical plane of member 14 and the like plane of member 16 as will later appear. Such extensions 22 include oppositely disposed tapered walls 24 which extend from their upper end downwardly and inwardly to point 26 and then vertically to the top edge 18 of plate 10 to provide the short vertical wall portions 28 and are provided with gussets 30 to provide added strength should the positioning of member 16 result in a heavy side thrust. Thus far described, the extensions 22 together with the top edge 18 of plate 10 defines a keystone shaped pocket or socket 32 for reception of the receiver plate 12 which will be referred to later in more detail.

Securely mounted to the base plate 10 below edge 18 and generally centrally positioned relative to pocket 32 is a pair of vertically disposed spaced parallel track bars 34 each having a vertical elongated slot or track 36 which are in a registering position with each other. A lock mount 38 encases the track bars 34 by extending adjacent their respective outer sides as at 40, below the same in a curved path as at 42 and across the top thereof in the form of a flat surface 44. A pivot pin 46 rotatably extends through tracks 36 and through the respective portions 40 of mount 38 and is connected at each end to respective free ends 48 and 50 of a U-shaped handle 52. A second pivot pin 54 is rotatably mounted through handle 52 near its closed end 56 and on each end of pin 54 is secured one end of an arm member 58. Arms 58 are parallel to each other and are connected at their other end by a pivot pin 60 so that the pins 54 and 60 together with the arms 58 define a locking link or hasp 61. Washers 62 may be used as needed.

The flat top portion 44 of the lock mount 38 in the embodiment illustrated in FIG. 1 is provided with a threaded hole to receive an adjusting screw 64. The head 66 of screw 64 is adapted to engage and bear against the underside of a pressure plate 68 which is secured to base plate 10 so that it presents a projecting surface flush with the top edge 18. A lock nut 70 is placed on the screw 64 above the mount 38 and below the screw head 68. Thus by adjustment of screw 64, the lock mount 34 may be adjusted toward and away from the pressure plate 68 within the range permitted by the tracks 36.

A face plate 72 encloses the outer side of the lock mount 38 and has a curved bottom lip portion 74 which extends inwardly below the bottom 42 of mount 38 and above pin 54. At each side of lip 74, the curved bottom of plate 72 is flared as at 76 to provide integral extensions projecting below the plane of lip 74. Lip 74 carries an upstanding pin 78 which extends through a hole 80 in portion 42 of mount 38 and abuts pin 46. A coil spring 82 on pin 78 abutting the pivot pin 46 at the top and a cotter pin 84 at the bottom normally urges the face plate 72 and its extensions 76 downwardly.

With reference now to the receiver plate 12, an arcuate receiver or cradle 86 is secured thereto and includes a receiver support plate 88 designed to register with the pressure plate 68. Also at each side of the receiver 12 there are the respective guide members 90 and with the respective base plate and receiver plate assemblies constructed and arranged as described, this fastening device will operate in the following manner.

When two bulky and heavy members such as 14 and 16 are to be coupled together, it will be appreciated that a great tension force must be applied and the construction and arrangement of the base plate 10 and receiver plate 12, as described, is to insure that such force is correctly controlled and does not tend to tear plates 10 and 12 from the respective members 14 and 16. In this respect the receiver plate support 88 braces the receiver plate 12 by acting as a gusset when it is not in close contact with the pressure plate 68 and when members 88 and 68 are in close contact, they confine the locking tension within this fastening device itself to eliminate torque which otherwise would tend to separate the receiver plate 12 from member 16. Plates 14 and 16 are further aided in alignment by the guide plates 90 whereby the receiver plate 12 is prevented from positioning itself behind the extensions 22 on plate 14. The angular relationship of sides 24 on extensions 22 will align the receiver plate 12 properly in relation to the pressure plate 68 if plate 12 is improperly aligned in its initial introduction, and once in position, plate 12 is held against vertical misalignment relative to plate 68 by the vertical wall portions 28 on extensions 22. It will be understood that several of these fastening devices may be employed on members 14 and 16 and thus the extensions 22 provide flared stops or guards projecting upwardly and outwardly from the upper edge 18 of member 14 which will receive the lower edge or bottom of a member 16. Such guard-like extensions facilitate the placing of plate 12 in registering position with plate 68 and are strengthened by gussets 30 to withstand the force of any heavy side thrust.

With members 14 and 16 thus positioned for locking, the open position of this device is illustrated in FIG. 2 and locking of members 14 and 16 is accomplished by moving pin 60 of the link 61 to nesting position in the receiver or cradle 86 on the receiver plate 12 (FIG. 1). This will necessitate a slight elevation of handle 52 to afford pin 60 clearance over cradle 86 and as soon as pin 60 is seated in member 86, handle 52 is pushed downwardly over center to abutting contact with member 14 as shown in FIG. 3 to maintain tension on pin 60. To unlock members 14 and 16, the above procedure is merely reversed.

Coupled with the over center type locking means just described is a secondary locking means which is one of the important features of this invention. This includes the face plate 72, pin 78, spring 82 and related parts which operate as follows. As handle 52 is moved downwardly to locking position, pin 54 is of course moved therewith and before such pin reaches its final locked position it will engage the lip 74 and the flared ends 76 thereof whereby the face plate 72 is pushed upwardly against spring 82. It will be noted that end 76 projects below the bottom plane of lip 74 so that as plate 72 is moved downwardly under force of spring 82 as pin 54 moves past it to its locked position, end 76 provides an obstruction or stop in the path of movement of pin 54 to open position. Thus, handle 52 cannot be accidentally opened and can only be opened by manually compressing plate 72 upwardly. It should also be noted that this secondary locking mechanism is located within the main body and structure of the primary locking means and that the face plate 72 serves not only as an operating lever but also as a shield or cover to protect the shielded parts from dirt, grime and other foreign matter.

Another important feature of this invention resides in its adjustability to variations in members 14 and 16. For example, in certain construction operations the use of several interchangeable bins for mounting on a single truck chassis at times may be desired and while such bins may generally be of like manufacture, there may be times when because of the use of a cushioning strip between members 14 and 16 or variations in the thickness of the abutting ends of such member, or any other reasons which may affect the alignment of these fastening devices which will have been previously mounted to such member in a predetermined pattern, that difficulty could be encountered in moving pin over the cradle 86. To overcome this problem, I have provided means for accommodating a variation in range between the cradle 86 and the reach of pin 60. This is accomplished by the track means 36 in the track bars 34 which permit a limited vertical travel of pin 46 (FIG. 3). Bars 34 are positioned to insure that lock mount 38 slides only parallel to them for accurate alignment and the relative position of the mount 38 is controlled by adjustment of the screw 64 and its related lock nut 70. It will thus be appreciated that by adjusting mount 38, the effective range of pin 60 relative to cradle 86 can be selectively increased or decreased within the range of tracks 36. Such adjustment of mount 38 can be made by applying a wrench to screw head 66 and nut 70 even while this device is in locked position, if necessary. With mount 38 thus adjusted relative to tracks 36, it will revert to the lower position therein when the primary locking link is in locked position, and upon re-engagement of such primary locking link it will rise until screw head 66 meets the bottom of the pressure plate 68 where its travel is arrested and its adjustment position becomes effective. The manual adjustment afforded by screw 64 just described may be automatic, if desired, and for such arrangement reference is made to FIG. 4 where screw 64, cap 68 and the locknut 70 is replaced by a short shaft 92 secured to and depending from the underside of the pressure plate 68 so as to extend through an opening 94 in the upper portion 44 of the lock mount 38. A compression spring 96 is on shaft 92 so as to engage the underside of plate 68 at one end and the top of member 44 at the other end. The lock mount 38 is slidable relative to shaft 92 and spring 96 normally and yieldingly urges the lock mount 38 to its lowermost position relative to tracks 36. In this way, the lock mount 38 may be moved within the limits of tracks 36 and spring 96 will always maintain pin 60 under proper tension in cradle 86.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A fastening device for releasably securing respective sides of two members in abutting relationship, said fastening device comprising a base plate rigidly attached to the one side of one member, a receiver plate rigidly attached to the abutting side of the other member, a lock mount movably mounted within predetermined limits on said base plate, a locking link carried by said lock mount, spaced guide members extending upwardly and outwardly from said base plate for effecting proper alignment of said receiver plate with said lock mount when said members to be fastened are introduced to each other, and a receiver on said receiver plate for engagement by said locking link.

2. A fastening device for releasably securing respective sides of two members in abutting relationship, said fastening device comprising a base plate rigidly attached to the one side of one member, a receiver plate rigidly attached to the abutting side of the other member, a pair of spaced track bars secured to said base plate, each track bar having an elongated track, a lock mount carried by said track bars and movable relative thereto within the limits of said tracks, said movement being toward and away from said receiver plate, means for adjusting the position of said lock mount relative to said receiver plate, a locking link carried by said lock mount, and a receiver on said receiver plate for engagement by said locking link.

3. A fastening device for releasably securing respective sides of two members in abutting relationship, said fastening device comprising a base plate rigidly attached to the one side of one member, a receiver plate rigidly attached to the abutting side of the other member, a pair of spaced track bars secured to said base plate, each track bar having an elongated track, a lock mount carried by said track bars and movable relative thereto within the limits of said tracks, said movement being toward and away from said receiver plate, spaced guide extensions on said base plate for effecting proper alignment of said receiver plate with said lock mount when said members to be fastened are introduced to each other, means for adjusting the position of said lock mount relative to said receiver plate, a locking link carried by said lock mount, and a receiver on said receiver plate for engagement by said locking link.

4. A fastening device for releasably securing respective sides of two members in abutting relationship, said fastening device comprising a base plate rigidly attached to the one side of one member, a receiver plate rigidly attached to the abutting side of the other member, a lock mount movably mounted within predetermined limits on said base plate, a locking link carried by said lock mount, upwardly and outwardly extending gusseted spaced guide extensions on said base plate, spaced guide members on said receiver plate engageable with said respective guide extensions for effecting proper alignment of said receiver plate with said lock mount both longitudinally and laterally when said members to be fastened are introduced to each other, and a receiver on said receiver plate for engagement by said locking link.

5. A fastening device for releasably securing respective sides of two members in abutting relationship, said fastening device comprising a base plate rigidly attached to the one side of one member, a receiver plate rigidly attached to the abutting side of the other member, a lock mount on said base plate, a locking link carried by said lock mount, spaced guide extensions on said base plate for effecting proper alignment of said receiver plate with said lock mount when said members to be fastened are introduced to each other, a receiver on said receiver plate for engagement by said locking link, and manually operable yielding means on said lock mount yieldingly engageable with said locking link when in locked position to hold said locking link against accidental release.

6. A fastening device for releasably securing respective sides of two members in abutting relationship, said fastening device comprising a base plate rigidly attached to the one side of one member, a receiver plate rigidly attached to the abutting side of the other member, a pair of spaced track bars secured to said base plate, each track bar having an elongated track, a lock mount carried by said track bars and movable relative thereto within the limits of said tracks, said movement being toward and away from said receiver plate, means for adjusting the position of said lock mount relative to said receiver plate, a locking link carried by said lock mount, a receiver on said receiver plate for engagement by said locking link, and manually operable yielding means on said lock mount yieldingly engageable with said locking link when in locked position to hold said locking link against accidental release.

7. A fastening device for releasably securing respective sides of two members in abutting relationship, said fastening device comprising a base plate rigidly attached to the one side of one member, a receiver plate rigidly attached to the abutting side of the other member, a lock mount on said base plate, a U-shaped handle pivotally attached at its open end to said lock mount, a locking link pivotally attached at one end to said handle by a first pin, a second pin on the other end of said locking link, a receiver on said receiver plate for engagement by said second pin, said second pin engageable with said receiver by first moving said handle and then moving said second pin to registering position with said receiver and moving said handle to abutting contact with said base plate in which position said first pin is over center and tension is applied to said second pin, and manually operable means on said lock mount engageable with said first pin in its over center position to hold said handle against accidental movement away from said base plate.

8. A fastening device for releasably securing respective sides of two members in abutting relationship, said fastening device comprising a base plate rigidly attached to the one side of one member, a receiver plate rigidly attached to the abutting side of the other member, a pair of spaced track bars secured to said base plate, each track bar having an elongated track, a lock mount carried by said track bars and movable relative thereto within the limits of said tracks, said movement being toward and away from said receiver plate, means for adjusting the position of said lock mount relative to said receiver plate, a U-shaped handle pivotally attached at its open end to said lock mount, a locking link pivotally attached at one end to said handle by a first pin, a second pin on the other end of said locking link, a receiver on said receiver plate for engagement by said second pin, said second pin engageable with said receiver by first moving said handle and then moving said second pin to registering position with said receiver and moving said handle to abutting contact with said base plate in which position said first pin is over center and tension is applied to said second pin, and manually operable means on said lock mount engageable with said first pin in its over center position to hold said handle against accidental movement away from said base plate.

9. A fastening device for releasably securing respective sides of two members in abutting relationship, said fastening device comprising a base plate rigidly attached to the one side of one member, a receiver plate rigidly attached to the abutting side of the other member, spaced extensions on said base plate projecting outwardly relative to the plane of said receiver plate, spaced guide members projecting perpendicularly from said receiver plate, said guide members engageable with said extensions for directing said receiver plate into proper alignment with said base plate when said plates are introduced to each other, a lock mount movably mounted on said base plate so as to be movable toward and away from said receiver plate, a locking link carried by said lock mount and having an open and closed position, a receiver on said receiver plate engageable by said locking link when in closed position, and a manually releasable yielding means on said lock mount engageable with said locking link when it is in closed position to hold it against accidental movement to open position.

10. A fastening device for releasably securing respective sides of two members in abutting relationship, said fastening device comprising a base plate rigidly attached to the one side of one member, a receiver plate rigidly attached to the abutting side of the other member, a lock mount on said base plate, a U-shaped handle pivotally attached at its open end to said lock mount, a locking link pivotally attached at one end to said handle by a first pin, a second pin on the other end of said locking link, a receiver on said receiver plate for engagement by said second pin, said second pin engageable with said receiver by first moving said handle and then moving said second pin to registering position with said receiver and moving said handle to abutting contact with said base plate in which position said first pin is over center and tension is applied to said second pin, a spring loaded face plate movably attached to said lock mount in covering relationship thereto, said face plate having an arcuate end on which is an arcuate projection, said arcuate end extending toward said base plate at one end of said lock mount, said first pin engaging the radii of said arcuate end and arcuate projection to move said face plate when said handle is moved into contact with said base plate, and said arcuate projection being moved by spring tension after said first pin has moved past to a position restricting the movement of said first pin away from said base plate.

11. A fastening device for releasably securing respective sides of two members in abutting relationship, said fastening device comprising a base plate rigidly attached to the one side of one member, a receiver plate rigidly attached to the abutting side of the other member, means on said base plate effecting registration by said receiver plate in relation thereto when said plates are introduced to each other, a first locking means on said base plate engageable with said receiver plate, and a second manually releasable yielding locking means on said first locking means to hold said first locking means against accidental release.

12. A fastening device for releasably securing respective sides of two members in abutting relationship, said fastening device comprising a base plate rigidly attached to the one side of one member, a receiver plate rigidly attached to the abutting side of the other member, means on said base plate effecting registration by said receiver plate in relation thereto when said plates are introduced to each other, a lock mount movably mounted on said base plate, said lock mount being movable between predetermined limits toward and away from said receiver plate, a first locking means on said lock mount engageable with said receiver plate, and a second manually releasable yielding locking means on said lock mount acting against said first locking means to hold said first locking means against accidental release.

13. A fastening device for releasably securing respective sides of two members in abutting relationship, said fastening device comprising a base plate rigidly attached to the one side of one member, a receiver plate rigidly attached to the abutting side of the other member, a lock mount movably mounted within predetermined limits on said base plate, means for adjusting the position of said lock mount relative to said receiver plate, a locking link carried by said lock mount, a receiver on said receiver plate for engagement by said locking link, and manually operable yielding means on said lock mount yieldingly engageable with said locking link when in locked position to hold said locking link against accidental release.

14. A fastening device for releasably securing respective sides of two members in abutting relationship, said fastening device comprising a base plate rigidly attached to the one side of one member, a receiver plate rigidly attached to the abutting side of the other member, a lock mount movably mounted within predetermined limits on said base plate, a locking link carried by said lock mount, a receiver on said receiver plate for engagement by said locking link, and compression means on said lock mount for automatically adjusting the position of said lock mount relative to said receiver plate.

15. A device as defined in claim 14 including manually operable yielding means on said lock mount yieldingly engageable with said locking link when in locked position to hold said locking link against accidental release.

References Cited in the file of this patent
UNITED STATES PATENTS
2,605,123    Claud-Mantle _____ July 29, 1952
FOREIGN PATENTS
854,603    Great Britain _____ Nov. 23, 1960